United States Patent
Loizzo et al.

(10) Patent No.: US 6,834,406 B1
(45) Date of Patent: Dec. 28, 2004

(54) METHOD TO OBTAIN A CLOTH SUITABLE FOR CLEANING ANY TYPE OF SURFACE

(76) Inventors: Antonio Loizzo, Largo F.S. Nitti, 39, 70022 Altamura (IT); Antonio Loizzo, Largo F.S. Nitti, 39, 70022 Altamura (IT)

( * ) Notice: Subject to any disclaimer, the term of this patent is extended or adjusted under 35 U.S.C. 154(b) by 385 days.

(21) Appl. No.: 10/042,437

(22) Filed: Jan. 10, 2002

(51) Int. Cl.⁷ .................................................. D06B 1/04
(52) U.S. Cl. ................................... 8/150; 8/147; 68/15
(58) Field of Search ....................... 28/100, 299; 8/147, 8/150, 157; 68/15

(56) References Cited

U.S. PATENT DOCUMENTS

| | | | | |
|---|---|---|---|---|
| 3,369,057 A | * | 2/1968 | Twilley ........................ 524/87 |
| 3,439,491 A | * | 4/1969 | Scruggs ........................... 57/5 |
| 3,546,063 A | * | 12/1970 | Breen ........................... 428/364 |
| 3,654,679 A | * | 4/1972 | Meneghini et al. ......... 156/148 |
| 3,785,918 A | * | 1/1974 | Kawai et al. ................ 428/372 |
| 3,940,535 A | * | 2/1976 | Gaeth et al. .................. 442/63 |
| 4,346,127 A | * | 8/1982 | Ruvolo et al. .............. 427/244 |
| 4,525,411 A | * | 6/1985 | Schmidt ..................... 428/198 |

FOREIGN PATENT DOCUMENTS

DE        19713709       * 10/1998

* cited by examiner

*Primary Examiner*—Frankie L. Stinson
(74) *Attorney, Agent, or Firm*—Harrison & Egbert

(57) ABSTRACT

Method to obtain a cloth suitable for cleaning any type of surface, the surfaces being glasses, or metallic wooden, plastic-coated and other similar surfaces. It is made by means of microfibres, cloth of polyamide and/or polyurethane and/or polyester. Before being used and once for all, the cloth is dipped in water brought to the boil for about 10 minutes.

7 Claims, No Drawings

METHOD TO OBTAIN A CLOTH SUITABLE FOR CLEANING ANY TYPE OF SURFACE

BACKGROUND OF THE INVENTION

1. Field of the Invention

The invention refers to a new application of synthetic fibres, generally called micro-fibres, for manufacturing a cloth to remove either dry or damp dirt.

2. Description of Related Art

To remove dirt from surfaces such as, for example, surfaces of glasses, furniture, metallic surfaces of cars, plastic-coated surfaces, taps and fittings, tiles, paving-tiles, silverware, crystal work, etc., it is necessary to make use of clothes which neither scratch the surfaces nor form haloes over them, but which are capable of removing dirt entirely.

The traditional cloth does not have such necessary requisites and call for the use of detergent substances which often spoil the surfaces to be cleaned.

Furthermore, since said traditional clothes are to be soaked with water mixed with chemical detergents, the drying out of said surfaces is to be carried out by making use of dry clothes, the cleaning so requiring more time to be done.

In some cases, for example if a car windscreen is to be cleaned by simply using water, in lack of proper detergent substances, dirt may not be removed.

At last, while removing either dust or, in particular, the earthy materials which gather over the metallic surface of cars during their motion, the traditional clothes may scratch the surfaces or not completely remove dirt.

The U.S. Pat. No. 4,346,127 issued in Aug. 24, 1992, discloses the process to prepare an absorbing mop material having a weight grams ranging from 100 to 750 gr/sqm, comprising a substrating of non woven fibres and flexible, porous polymeric binders.

This mop material contains non woven web of textile fibres of cellulose material, a polymeric aqueous dispersion of a thermo coagulating agents suitable for thermo regulation, and expanding agents instead of polyurethane and polyamide.

The other claims refer to other treatment and to inclusion of other components etc.

Furthermore the U.S. Pat. No. 4,346,127 does not disclose the application to clean for example of the windscreen by simply using water in lack of proper detergent substances and removing the dust and earthy materials from the surface of a car with a dry cloth.

BRIEF SUMMARY OF THE INVENTION

Therefore the invention relates above all to the procedure for preparing the absorbing mop and not to the applications and the mode to use the cloth, i.e. the use without detergent substances that spoil the surfaces to be cleaned, without the use of dry clothes to drying the surfaces with chemical detergents.

DETAILED DESCRIPTION OF THE INVENTION

The first aim of the present invention is to provide a method apt to remove dirt just by means of water and without any chemical detergent, so overcoming all the above said drawbacks.

Another aim of the invention is to provide a method based on a cloth which, after removing dirt without chemical detergents, may be rinsed, so to be once more well cleaned and ready for use.

Another aim of the invention is to provide a cloth suitable to stand both tearing and rubbing tests.

Still another important aim of the invention is to provide a cloth for removing dirt, suitable to stand high temperatures, for example when hot water or steam are used.

For these ends, the invention solves the problem of providing a cloth, included among a large range of cloths, apt to remove dry dirt by rubbing the surfaces which maybe used without scratching the surface, and which is also apt to remove damp dirt by means of an absorbing action obtained by simply making use of water.

Furthermore, the invention solves the problem of providing a cloth which perfectly stands abrasion and tearing, and which has physical and chemical properties which do not get altered when the cloth is exposed to temperatures from $-30°$ C. up to $+150°$ C. so as to be used also for military applications in very cold or very hot areas, for example to clean the windscreen of a car.

These important features of the cloth according to the invention are due to the fact that it is made of synthetic fibres, i.e. micro-fibres, preferably deriving from polyamide and polyurethane, which form velvet elements acting like micro-spoons and apt to gather and remove dry dirt without scratching the surfaces.

Another very important feature of the cloth according to the invention is due to the fact that, together with water, it first keeps damp dirt and then, after absorbing it, releases said dirt (water-repellent action) as soon as said cloth is washed by means of clean water.

In other words, the cloth, soaked with water, works like a soap, i.e. it reduces the surface tension of the water which touches dirt, so as to facilitate the absorption of said dirt.

In a preferred embodiment of the invention, a cloth made of polyamide (50%) and polyurethane (50%) is used.

In another embodiment, the cloth is made of polyamide (50%) and polyester (50%).

Said composition may however vary with experimentally predetermined intervals,

To improve the working of the cloth in removing dirt, the invention also includes a treatment to be carried out upon the cloth before using it.

Said treatment consists in dipping the cloth in water brought to the boil for about ten minutes.

Said treatment may be carried out only by users: the cloth is ready for use after getting cool.

The cloth, accordingly, is placed on the market without undergoing said previous treatment.

We claim:

1. A method for obtaining a cloth for cleaning any type of surface comprising the steps of:
    forming the cloth of polymeric micro-fibers selected from the group consisting of polyamide, polyurethane, polyester and mixtures thereof;
    boiling water; and
    dipping said cloth in the boiling water for approximately ten minutes.

2. The method of claim 1, said step of forming comprising:
    forming said cloth of polymeric micro-fibers of polyamide and polyurethane, said polyamide being 50% by weight and said polyurethane being 50% by weight.

3. The method of claim 1, said step of forming comprising:
   forming said cloth of polymeric micro-fibers of polyamide and polyester, said polyamide being 50% by weight and said polyester being 50% by weight.

4. The method of claim 1, said step of forming comprising:
   forming said cloth of polymeric micro-fibers being of a mixture of two materials selected from the group consisting of polyamide, polyurethane and polyester, one of the two materials being within 20% by weight of the other material.

5. The method of claim 1, said polymeric micro-fibers suitable for withstanding temperatures ranging between −30° C. and 150° C.

6. The method of claim 1, said cloth being absorbent.

7. The method of claim 1, further comprising:
   removing dust with said cloth without using detergents.

* * * * *